Patented June 13, 1944

UNITED STATES PATENT OFFICE 2,351,102

POLYMERIC VINYLIDENE CHLORIDE COMPOSITION

Edgar C. Britton and Fred Lowell Taylor, Midland, Mich., assignors to The Dow Chemical Company, Midland, Mich., a corporation of Michigan No Drawing. Application October 29, 1940, Serial No. 363,352

8 Claims. (Cl. 260—36)

This invention relates to compositions of matter comprising polymeric vinylidene chloride products and plasticizers therefor which are capable of lowering the softening point of the polymer without at the same time reducing the tensile strength of articles producible therefrom to the extent that this property is reduced by most of the previously known plasticizers.

The polymer of vinylidene chloride alone is described in U. S. Patent No. 2,160,903, and many of its co-polymers with other polymerizable compounds as well as certain plasticized compounds comprising these co-polymers, and ways in which the products may be made, are described in U. S. Patents 2,160,931 to 2,160,948, inclusive. The polymer of vinylidene chloride alone and co-polymers of vinylidene chloride with other polymerizable compounds wherein the vinylidene chloride predominates will herein be referred to as "polymeric vinylidene chloride products." Such products are thermoplastic in nature and, in the main, find primary application in the manufacture of molded and extruded articles.

Polymeric vinylidene chloride products when subjected to the conditions of temperature and pressure required in molding operations are found, commonly, to be subject to thermal decomposition to a sufficient extent to cause darkening of the polymer. Various plasticizers and heat stabilizing agents have been proposed heretofore to protect the polymeric product from such injurious effects of prolonged exposure to heat. Most of the plasticizers previously proposed have the disadvantage of weakening the molded product when the plasticizer is present in sufficient quantities to reduce the flow point of the compositions enough to avoid thermal decomposition. Similarly, most of the heat stabilizers proposed for use with polymeric vinylidene chloride products are deficient as to plasticizing properties, and hence, do not materially lower the flow point of a polymer to which they may be added.

The factors, tensile strength and flexibility, are both important in molded or extruded articles and it is often desired to improve the flexibility of the thermo-plastic while lowering its flow point without at the same time producing a composition that yields only weak molded or extruded articles. Compositions of polymeric vinylidene chloride products which conform to the above stated requirements to a fully satisfactory extent have not been produced heretofore.

It is, accordingly, an object of the present invention to provide polymeric vinylidene chloride compositions which are so plasticized as to have lowed flow points than do the polymers from which they are produced, and which at the same time are capable of withstanding the effects of temperature and pressure during molding or extrusion operations to yield shaped products of improved flexibility as compared with the unplasticized polymer, without unduly reducing the tensile strength of the articles formed as compared with the strength of similar articles produced from the unplasticized polymer. Other and related objects will appear hereinafter as the description proceeds.

It has now been found that the foregoing and related objects may be attained and the desired advantageous combination of properties previously mentioned may be produced in a polymeric vinylidene chloride composition through the incorporation in a polymeric vinylidene chloride product of plasticizing quantity (suitably from 5 to 40 per cent, and preferably from 5 to 20 per cent) of an alpha-phenyl-ethyl ether or halogen-substituted alpha-phenyl-ethyl ether of a mono- or polyhydric phenol. Compounds conforming to this definition are true solvent plasticizers for the thermo-plastic polymeric vinylidene chloride products and when present in sufficient quantities to reduce the softening point or the flow point of the polymer do not detract to any material extent from the tensile strength of molded or extruded articles produced from the polymer. The new plasticizers serve also as agents to prevent thermal decomposition of the polymers during molding or extrusion operations due partially, at least, to the lower softening points of the compositions as compared with those of the original polymer and partially to a stabilizing action, the precise nature of which has not definitely been determined.

Plasticizers falling within the scope of the above definition are included in the following list:

Alpha-phenyl-ethyl 2-anisyl ether
Alpha-(4-chloro-phenyl)-ethyl 2-anisyl ether
Alpha - (2.4-di-chloro-phenyl) - ethyl 2 - anisyl ether
Alpha-(4-chloro-phenyl)-ethyl 2-xenyl ether
Alpha - (4-chloro-phenyl) - ethyl (5-chloro-2-xenyl) ether
Alpha-(2.4-di-chloro-phenyl)-ethyl (5-chloro-2-xenyl) ether
Alpha - (4 - chloro - phenyl) - ethyl 4 - chlorophenyl ether The foregoing list of compounds conforming to the definition of the plasticizers of the present invention is given solely by way of example and is not to be construed as limiting the invention.

It has been found that the tensile strength of extruded strands of polymeric vinylidene chloride compositions containing 15 per cent of one of the alpha-phenyl-ethyl ethers of a phenol, typified by those enumerated above, are in each case as strong as strands of like diameter made from the corresponding unplasticized polymeric vinylidene chloride product. In nearly every case compositions containing 10 per cent of the herein described plasticizers yield extruded or molded articles of substantially higher tensile strength than those of like articles produced from the corresponding unplasticized polymer. When the amount of plasticizer is increased to above 20 per cent of the composition the tensile strength of articles producible therefrom is, in most cases, somewhat lower than that of similar articles made from the unplasticized polymer, though certain exceptions to this lowering have been noted where 20 per cent of plasticizer still allows formation of articles as strong or stronger than those made from the untreated polymer. In every case, the present plasticizer, when employed in amounts of 5 per cent or more of the weight of the composition, causes the formation of articles having a greater flexibility than those producible from the unplasticized product. Tensile strength measurements made in connection with the present compositions were carried out in standard testing equipment for this purpose. The flexibility was determined either by empirical methods or in a testing machine especially designed for that purpose.

The following table illustrates the effect of certain of the designated plasticizers on the property of extruded filaments of a co-polymer containing about 90 per cent of vinylidene chloride and about 10 per cent of vinyl chloride. In the last column of the said table is given the tensile strength of filaments of the various compositions after said filaments had been tied in a simple knot. The reported figures are surprisingly high for knotted strands in comparison with the tensile strengths of the unknotted or straight strands of the same composition.

Table

| Plasticizer | Amount | Tensile strength, lbs./sq. in. | |
|---|---|---|---|
| | | Straight | Knotted |
| | Per cent | | |
| Alpha-phenyl-ethyl 2-anisyl ether | 10 | 39,500 / 33,000 | |
| | 15 | 33,000 / 32,000 | |
| | 20 | 20,000 / 15,000 | |
| Alpha-(4-chloro-phenyl)-ethyl 2-anisyl ether | 15 | 36,000 / 41,000 / 29,500 / 38,200 | 20,000 / 20,000 |
| | 20 | 23,900 / 27,500 | 13,700 / 15,500 |
| Alpha-(2,4-di-chloro-phenyl)-ethyl 2-anisyl ether | 20 | 32,500 / 32,500 | 18,300 / 18,000 |
| Alpha-(4-chloro-phenyl)-ethyl 2-xenyl ether | 20 | 44,300 / 38,300 | |
| Alpha-(4-chloro-phenyl)-ethyl (5-chloro-2-xenyl) ether | 10 | 50,000 / 42,500 / 39,500 | 25,500 / 25,000 |
| | 15 | 48,500 / 49,500 | 28,500 / 20,000 |
| | 20 | 35,300 / 33,000 | 20,500 / 31,000 |
| Alpha-(2,4-di-chloro-phenyl)-ethyl (5-chloro-2-xenyl) ether | 10 | 44,500 / 43,200 / 40,000 | 29,800 / 27,300 |
| | 15 | 48,200 / 64,000 | 21,500 / 31,300 / 20,800 |
| | 20 | 39,000 / 48,000 | 27,700 / 20,700 |
| Blank | 0 | 30,000 / 33,200 | About 17,000 / About 20,000 |

The invention has been illustrated primarily with respect to particular co-polymers of vinylidene chloride and vinyl chloride. Results of comparable nature, varying only as to the absolute values, have been obtained with these and other plasticizers of the same type incorporated in other co-polymers of vinylidene chloride. For example, the co-polymers of vinylidene chloride with vinyl acetate, vinyl cyanide, methyl methacrylate, ethyl acrylate, chloroallyl-chloroacetate, styrene, and the like, wherein vinylidene chloride predominates, are all benefited by the incorporation therein of plasticizers of the present type.

The manner of incorporation of the plasticizer in the polymeric product to form the new composition is relatively unimportant. Any method of compounding or mixing the ingredients known to the art may be employed to suit the convenience of the user.

We claim:

1. A composition of matter consisting on the solids basis essentially of a polymeric vinylidene chloride product plasticized with from about 5 to about 20 per cent of a nuclearly substituted alpha-phenyl-ethyl phenol ether wherein the substituent is selected from the class consisting of methoxyl, chlorine, and phenyl radicals.

2. A composition as claimed in claim 1 wherein the polymeric vinylidene chloride product is a co-polymer of vinylidene chloride and vinyl chloride in which the vinylidene chloride predominates.

3. A composition as claimed in claim 1 wherein the plasticizer is alpha-phenyl-ethyl 2-anisyl ether.

4. A composition as claimed in claim 1 wherein the plasticizer is alpha-(4-chloro-phenyl)-ethyl 2-anisyl ether.

5. A composition as claimed in claim 1 wherein the plasticizer is alpha-(4-chloro-phenyl)-ethyl 2-xenyl ether.

6. A composition of matter consisting on the solids basis essentially of a co-polymer of vinylidene chloride and vinyl chloride, wherein vinylidene chloride predominates, plasticized with from about 5 to about 20 per cent of alpha-phenyl-ethyl 2-anisyl ether.

7. A composition of matter consisting on the solids basis essentially of a co-polymer of vinylidene chloride and vinyl chloride, wherein vinylidene chloride predominates, plasticized with from about 5 to about 20 per cent of alpha-(4-chloro-phenyl)-ethyl 2-anisyl ether.

8. A composition of matter consisting on the solids basis essentially of a co-polymer of vinylidene chloride and vinyl chloride, wherein vinylidene chloride predominates, plasticized with from about 5 to about 20 per cent of alpha-(4-chloro-phenyl)-ethyl 2-xenyl ether.

EDGAR C. BRITTON.
FRED LOWELL TAYLOR.